(12) United States Patent
Gill

(10) Patent No.: US 7,048,309 B2
(45) Date of Patent: May 23, 2006

(54) PIPE COUPLING

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 0 days.

(21) Appl. No.: 10/718,017

(22) Filed: Nov. 20, 2003

(65) Prior Publication Data

US 2005/0052023 A1    Mar. 10, 2005

Related U.S. Application Data

(63) Continuation-in-part of application No. 10/665,089, filed on Sep. 17, 2003, which is a continuation-in-part of application No. 10/654,666, filed on Sep. 4, 2003.

(51) Int. Cl.
*F16L 17/00* (2006.01)

(52) U.S. Cl. .................. 285/104; 285/105; 285/106; 285/107; 285/108; 285/243; 285/369

(58) Field of Classification Search ................ 285/95, 285/104, 105, 106, 107, 108, 109, 243, 306, 285/900, 369

See application file for complete search history.

(56) References Cited

U.S. PATENT DOCUMENTS

| | | | | |
|---|---|---|---|---|
| 382,514 A * | 5/1888 | Davis | ............... | 285/106 |
| 1,861,211 A * | 5/1932 | Gammeter | ............... | 285/106 |
| 1,898,623 A * | 2/1933 | Gammeter | ............... | 285/96 |
| 1,905,324 A * | 4/1933 | Waters | ............... | 285/104 |
| 2,017,994 A * | 10/1935 | Spang | ............... | 285/105 |
| 2,020,554 A * | 11/1935 | Johnson | ............... | 285/383 |
| 2,127,284 A * | 8/1938 | Board | ............... | 285/341 |
| 2,184,376 A * | 12/1939 | Beyer et al. | ............... | 285/105 |
| 2,449,795 A * | 9/1948 | Stillwagon | ............... | 285/104 |
| 2,635,901 A * | 4/1953 | Osborn | ............... | 285/33 |
| 3,024,046 A * | 3/1962 | Frost et al. | ............... | 285/104 |
| 3,582,112 A * | 6/1971 | Pico | ............... | 285/96 |
| 3,810,665 A * | 5/1974 | Rodgers | ............... | 285/97 |
| 3,843,167 A * | 10/1974 | Gronstedt | ............... | 285/18 |
| 3,877,733 A * | 4/1975 | Straub | ............... | 285/105 |
| 4,466,640 A * | 8/1984 | Van Houtte | ............... | 285/104 |
| 5,779,285 A * | 7/1998 | Robison | ............... | 285/337 |
| 5,791,698 A * | 8/1998 | Wartluft et al. | ............... | 285/328 |
| 5,868,441 A * | 2/1999 | Gill | ............... | 285/322 |
| 6,106,029 A * | 8/2000 | DeMore et al. | ............... | 285/322 |
| 6,186,560 B1 * | 2/2001 | Gill | ............... | 285/305 |
| 6,481,862 B1 * | 11/2002 | Lang et al. | ............... | 359/871 |
| 6,565,125 B1 * | 5/2003 | Robison, Jr. | ............... | 285/104 |

* cited by examiner

*Primary Examiner*—James M. Hewitt
(74) *Attorney, Agent, or Firm*—Thorpe North & Western, LLP; Robert R. Mallinckrodt

(57) ABSTRACT

A coupling for attachment to the end portion of a pipe includes jaw members adapted to slide along an inner end taper in the coupling body so that linear movement of the jaw members toward the end of the inner end taper adjacent an end of the coupling body causes movement of the jaw members radially inwardly of the coupling body against the end portion of the pipe when received in the coupling body. The coupling may include a bell type gasket to function as a spring and the spring action of the gasket may be augmented by installing a springy crib ring around the gasket inside the coupling body.

27 Claims, 14 Drawing Sheets

SECTION 4-4

PIPE COUPLING

RELATED APPLICATIONS

This is a continuation-in-part of application Ser. No. 10/665,089 filed Sep. 17, 2003, which is a continuation-in-part of application Ser. No. 10/654,666 filed Sep. 4, 2003.

BACKGROUND OF THE INVENTION

1. Field

The invention is in the field of couplings to connect plain end or grooved end or shouldered end portions of pipes and pipe fittings.

2. State of the Art

There are various types of mechanical couplings which employ various radial mechanical means, such as clamps and split rings to secure the couplings to plain end pipes and pipes having circumferential grooves on the ends of the pipes and to connect the pipes to other pipes or to various pipe fittings. However, these couplings can develop leaks under excessive temperature changes when the pipe shrinks to assume a smaller diameter than the original diameter. For example, if the coupling is made of metal and the pipe is made of polyethylene material, the thermal differential expansion of the two materials is such that the developing of a leak is a natural outcome. To eliminate this problem, the coupling of the invention is provided with slidable jaw members which respond to the thermal diametrical change of the pipe, and with a diaphragm seal also designed to accommodate such changes. The coupling of the invention can accommodate predetermined thermal expansion of the pipe links, which other couplings cannot do.

SUMMARY OF INVENTION

According to the invention, a coupling for connecting to the end portion of a pipe includes a coupling body with a receiving opening therein so that the coupling body closely receives and surrounds the end portion of a pipe to be coupled. The coupling has an inner end taper and a set of jaw members slidably positioned in the inner end taper of the coupling body so that linear movement of the jaw members toward the end of the inner end taper causes movement of the jaw members radially inwardly of the coupling body against the end portion of the pipe when received in the coupling body. Linear movement of the jaw members in the opposite direction allows radial movement of the jaw members away from the received pipe to release the pipe from the coupling. Means, such as laterally extending slots through the inner end taper of the coupling body with bolts extending from the jaw members slidably through the slots, secure the jaw members to the coupling body and move the jaw members away from the received pipe when the jaw members are moved in such opposite direction. The inner end taper with accompanying jaw members can be provided in one end of the coupling or may be provided in both ends of the coupling. The pipe is generally circular in cross section and the coupling body may be circular or polygonal in cross section.

THE DRAWINGS

Figure 1:
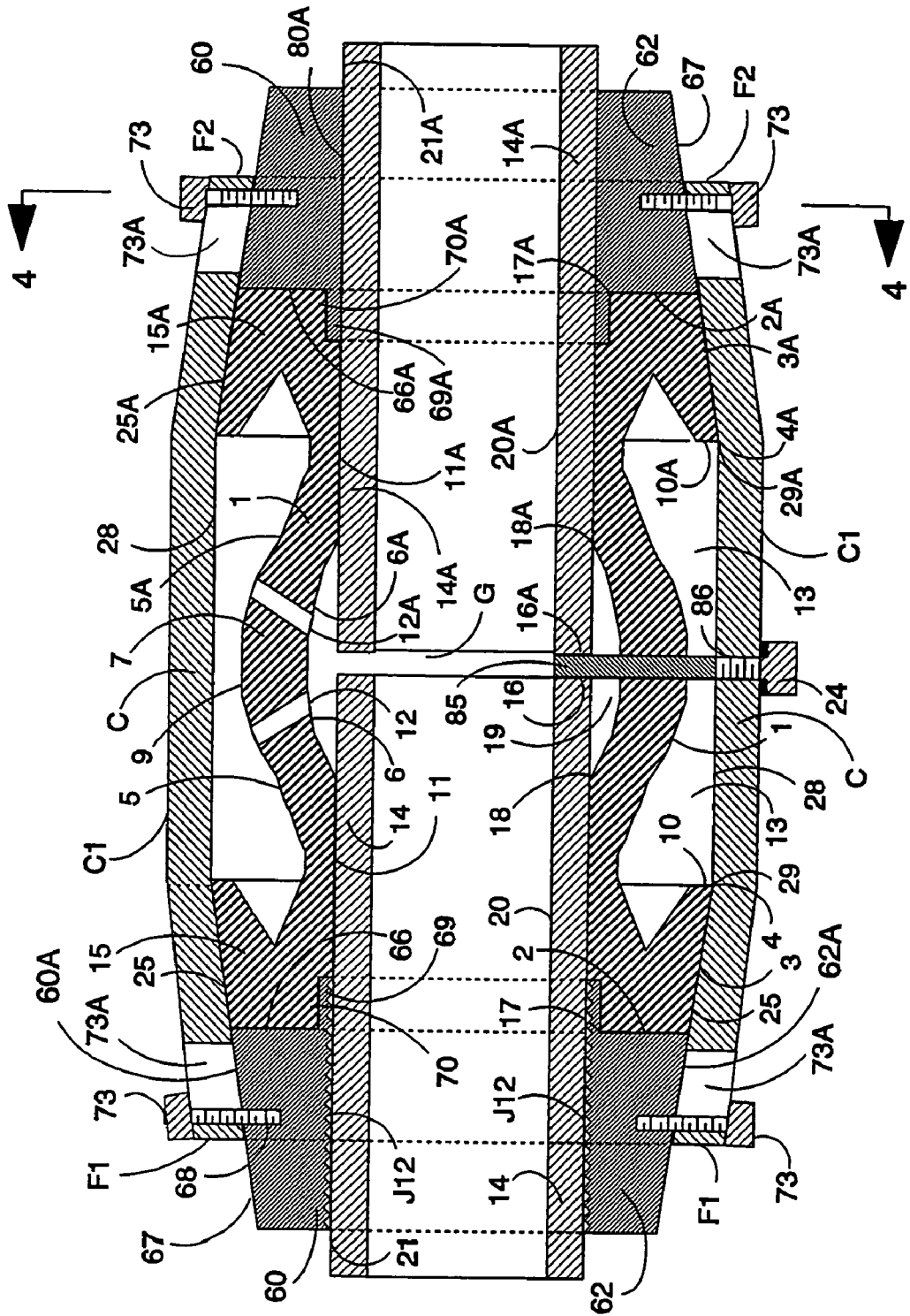
Figure 2:
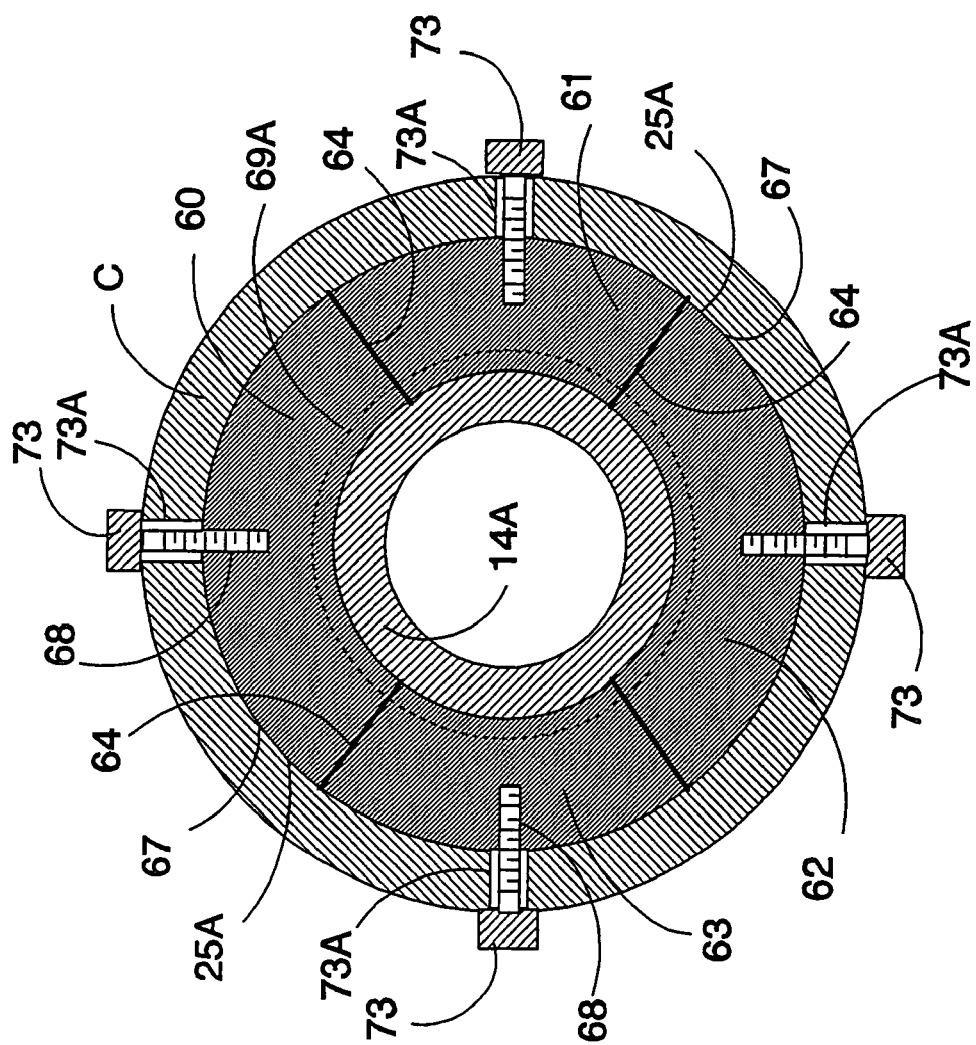

The best mode presently contemplated for carrying out the invention is illustrated in the accompanying drawings, in which:

FIG. 1 is a longitudinal vertical section of the coupling of the invention taken through the slidable jaws in engaged and locked position with the two pipes coupled;

FIG. 2, a transverse vertical section taken on the line 4—4 of FIG. 1

Figure 3:
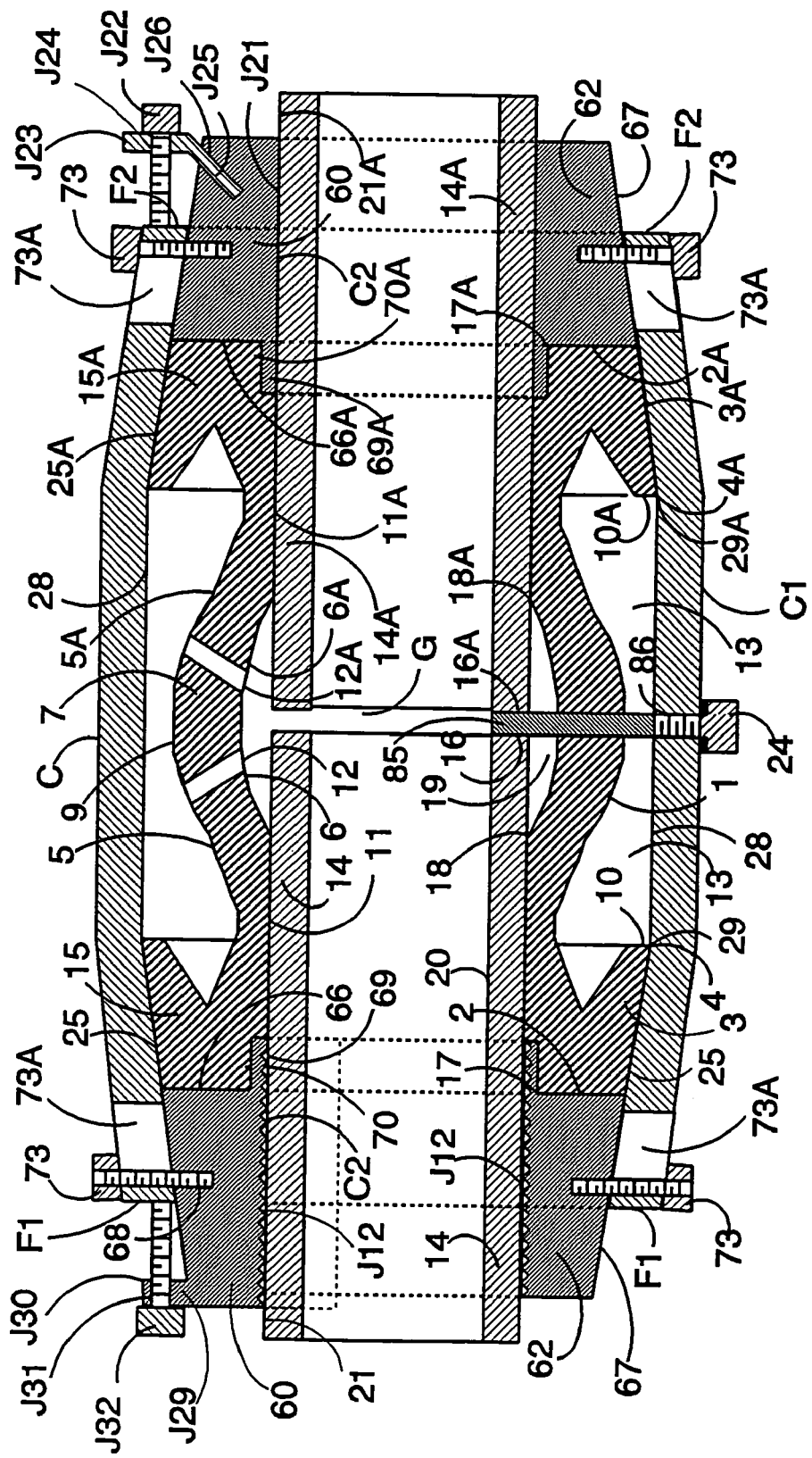

FIG. 3, a section similar to that of FIG. 1 but showing two embodiments of mechanical jaw pullers.

Figure 4:
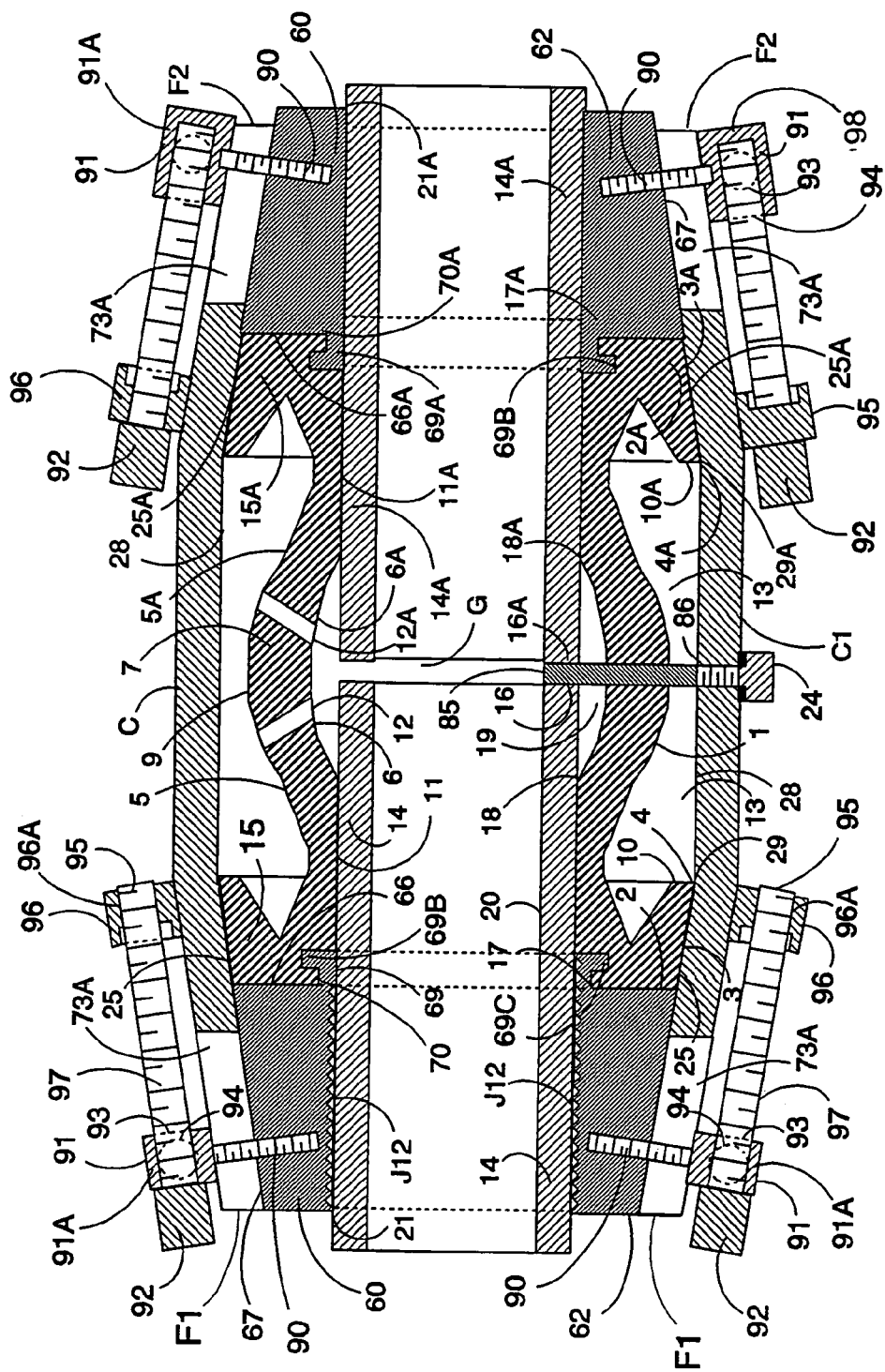
Figure 5:
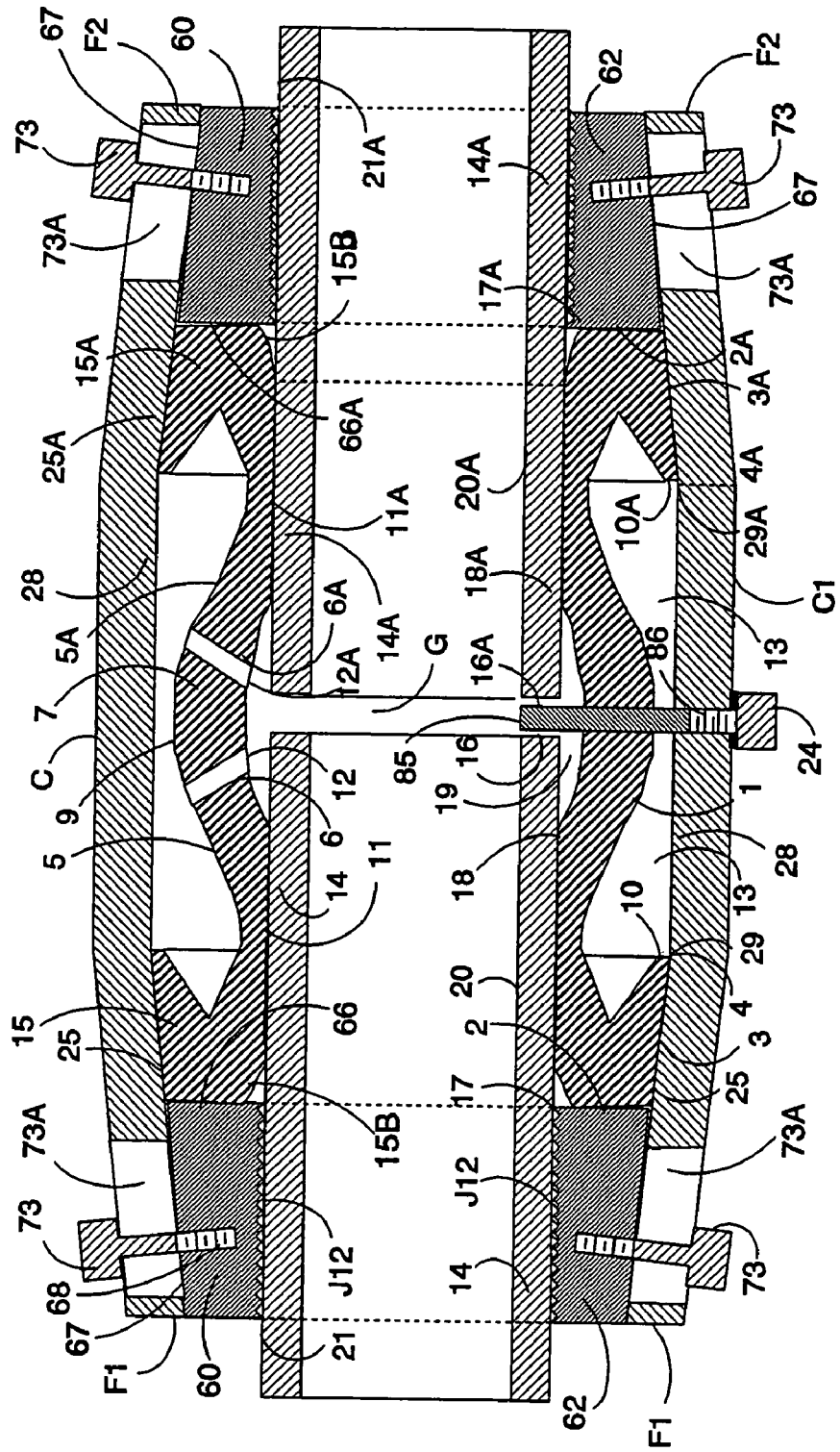
Figure 6:
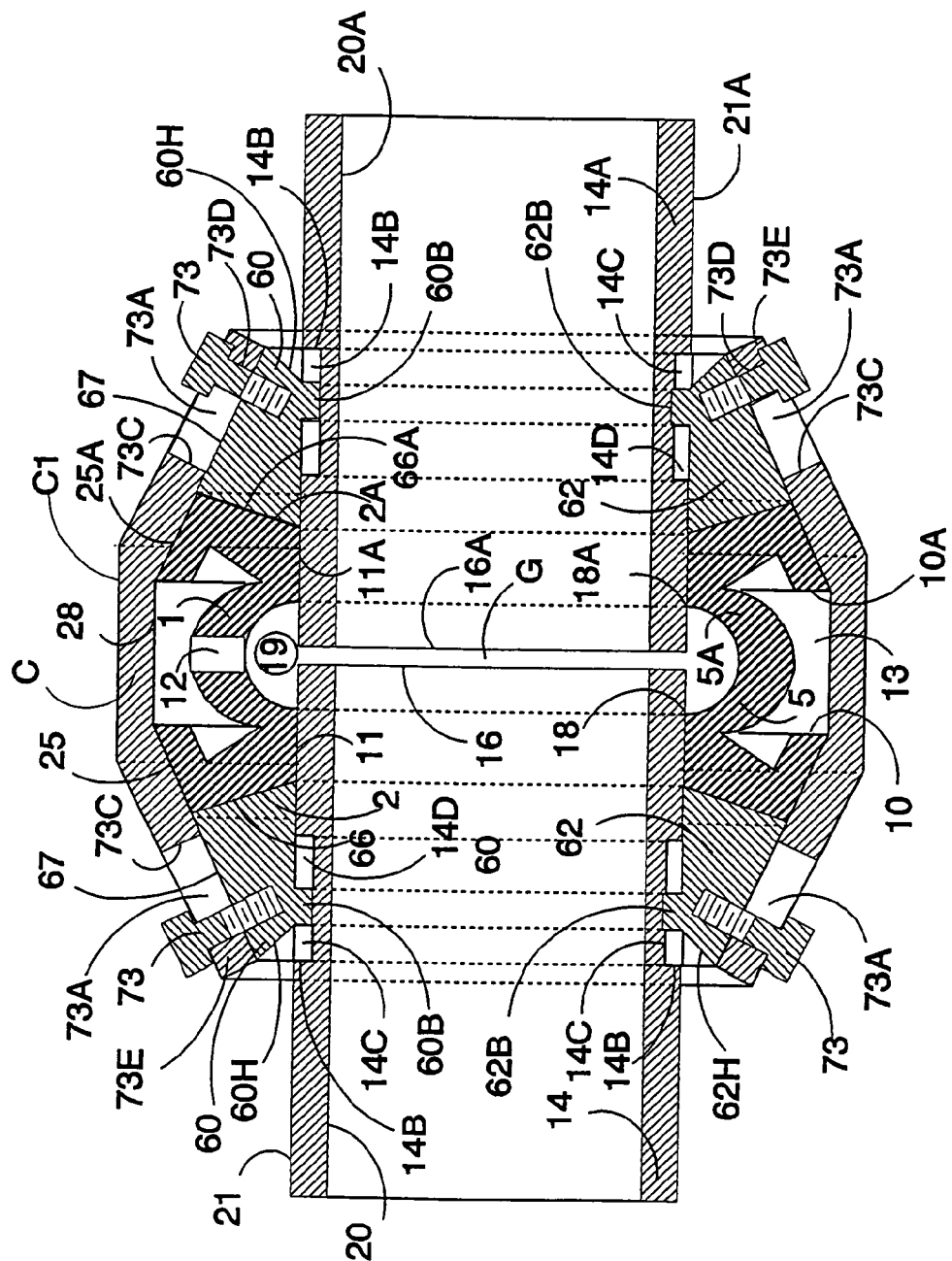
Figure 7:
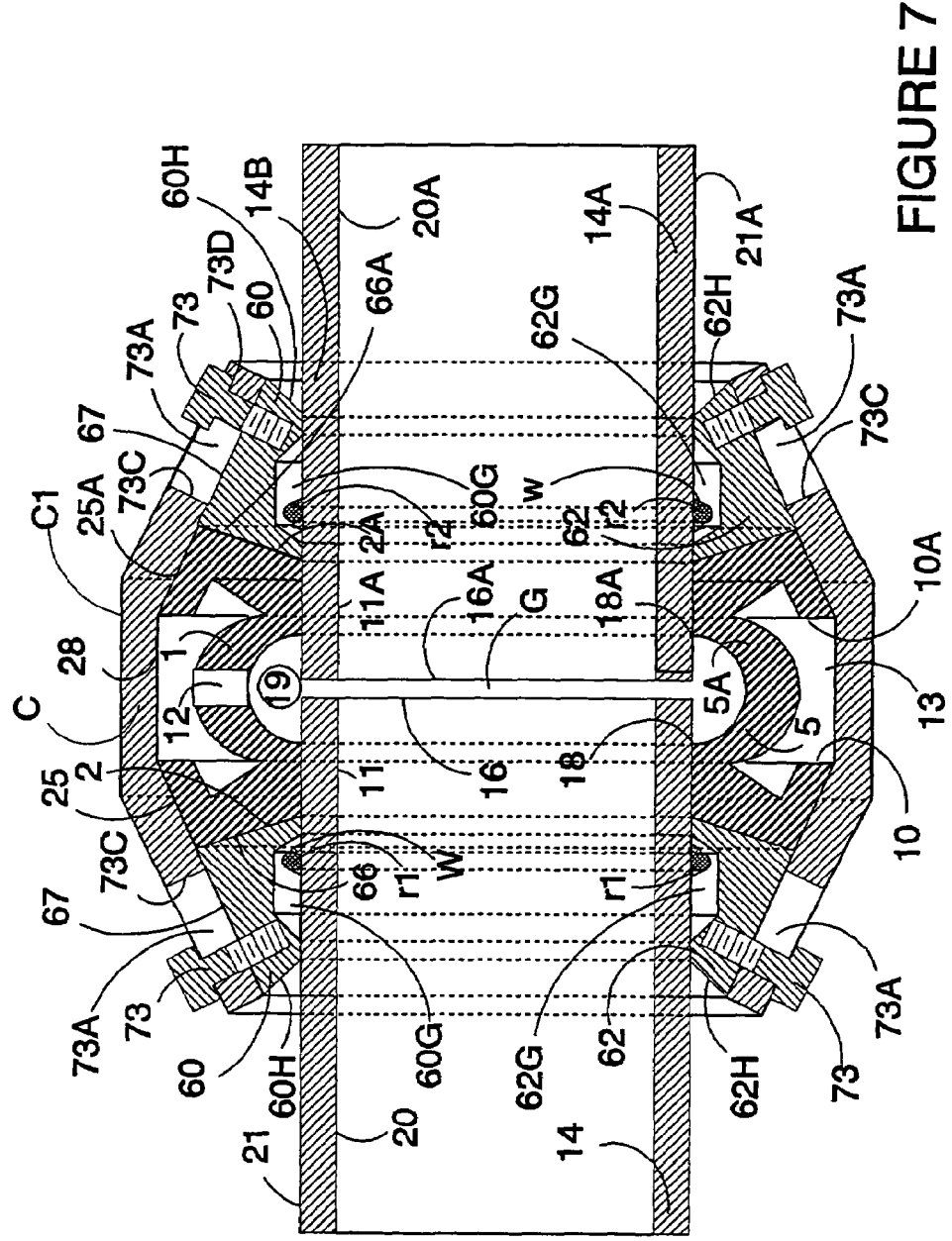
Figure 8:
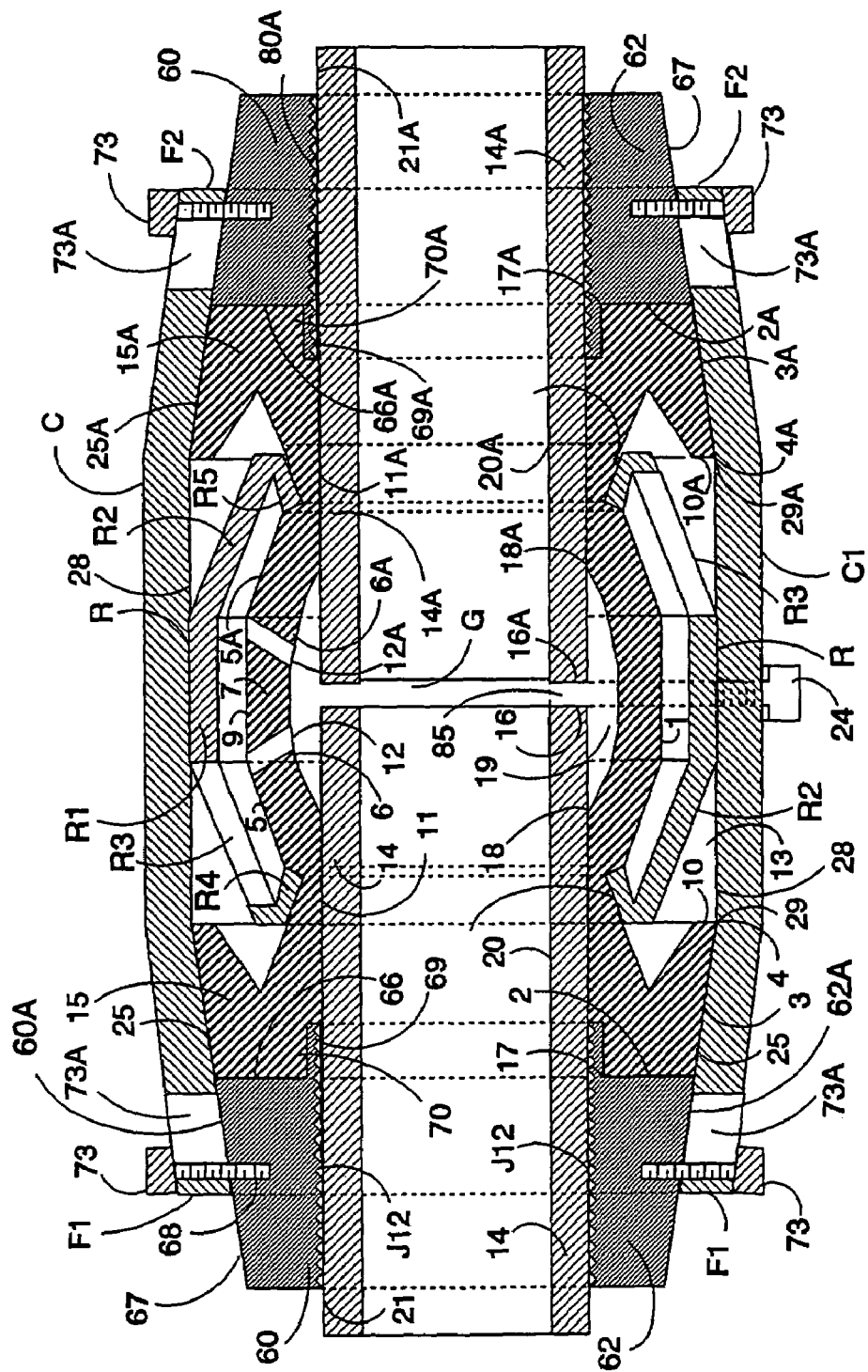

FIG. 4, a section similar to the section in FIG. 3, but shows modified version of the jaws, seals and mechanical pullers and spreaders;

FIG. 5, a longitudinal vertical section similar of coupling shown in FIG. 1, but jaws and gasket are modified in design;

FIG. 6, a longitudinal vertical section of miniature version of invented coupling to attach two pipes each having a circumferential groove in its end portion;

FIG. 7, a longitudinal vertical section of miniature version of invented coupling as shown in FIG. 6, but jaws are modified to attach two pipes each having a circumferentially welded shoulder ring in its end portion;

FIG. 8, a longitudinal vertical section exactly as in FIG. 1, but an axially stretchable crib ring is framed inside the coupling body for pipe constructed from materials having high thermal coefficient of expansion.

Figure 9:
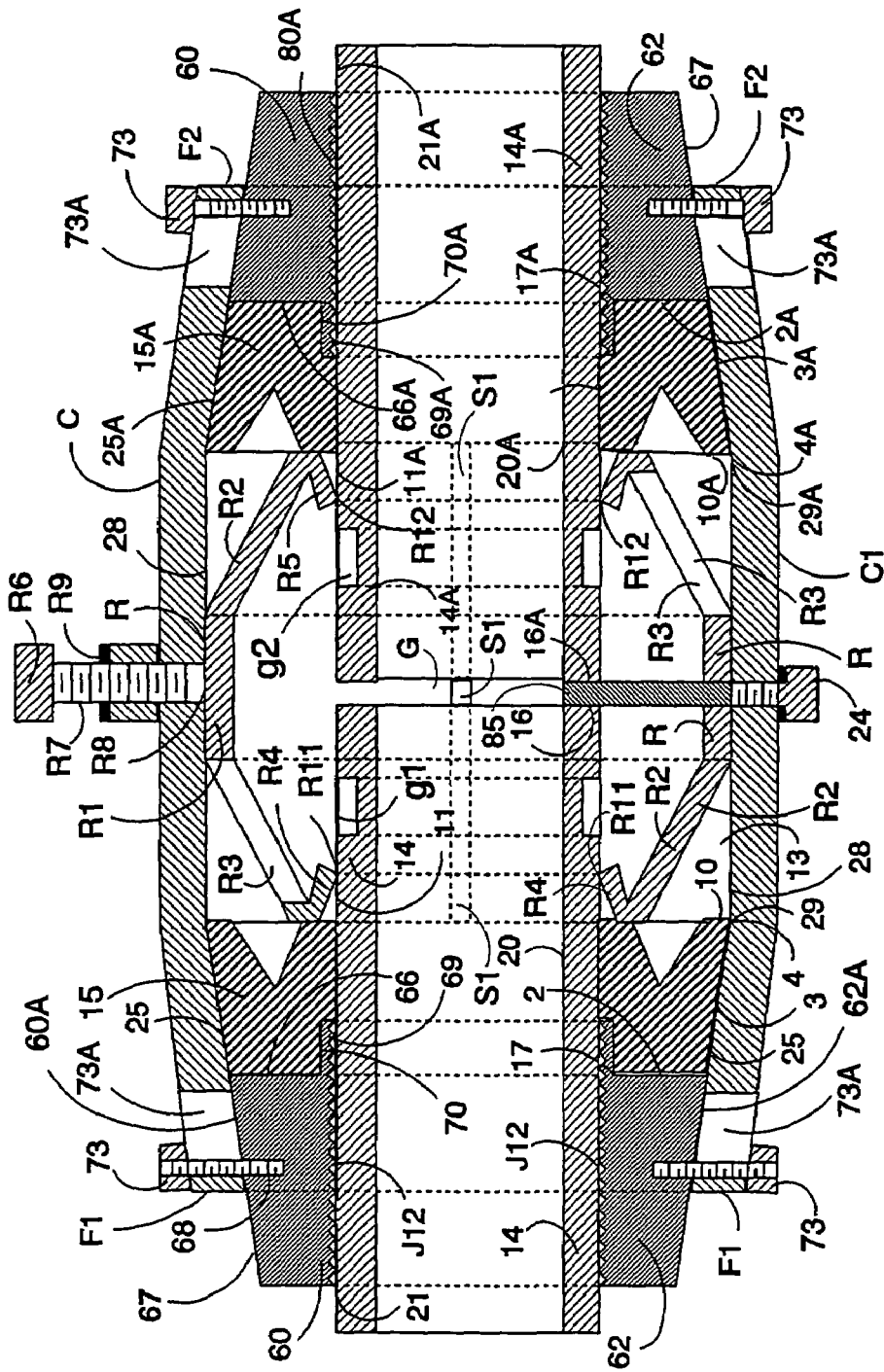
Figure 10:
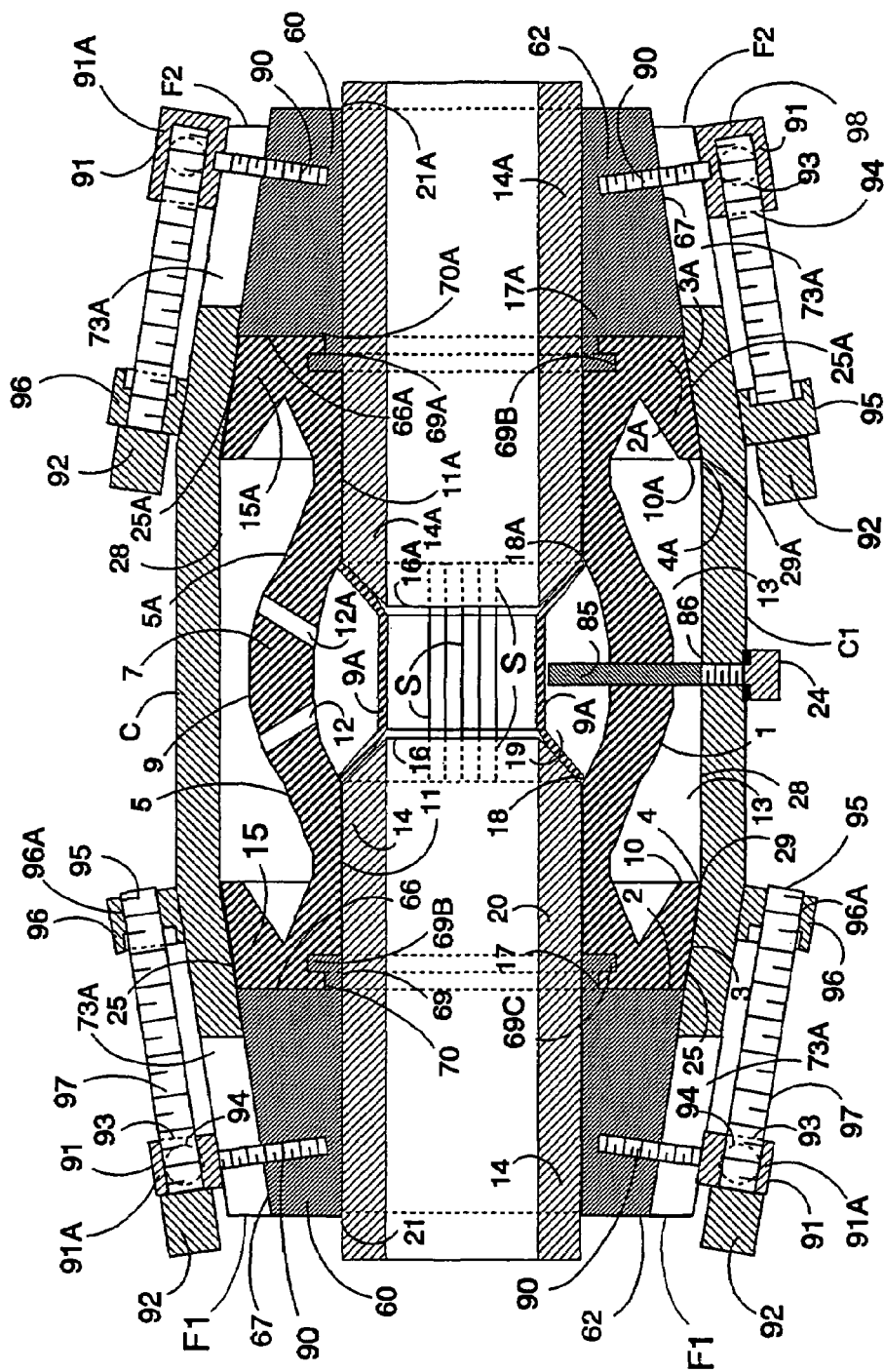
Figure 11:
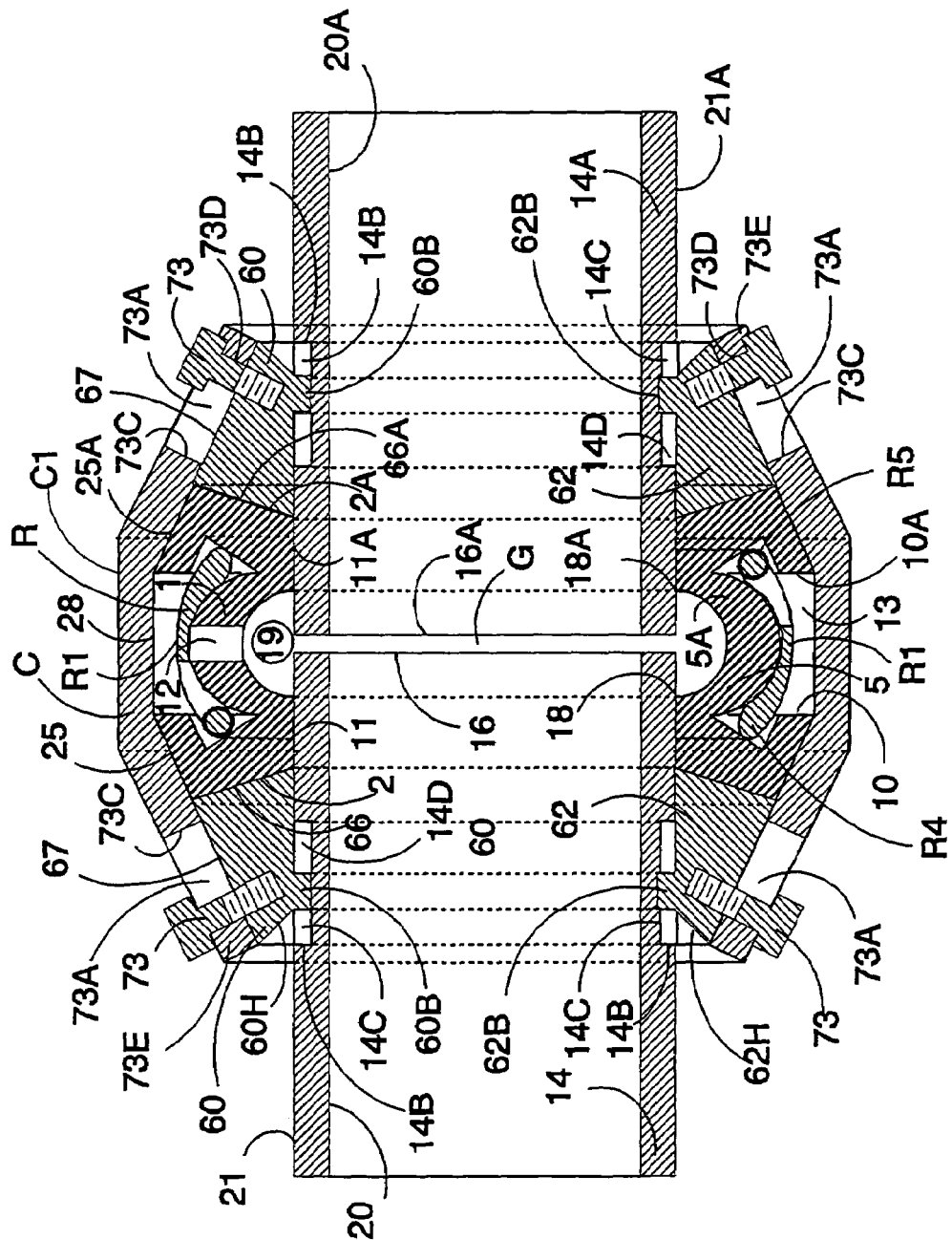
Figure 12:
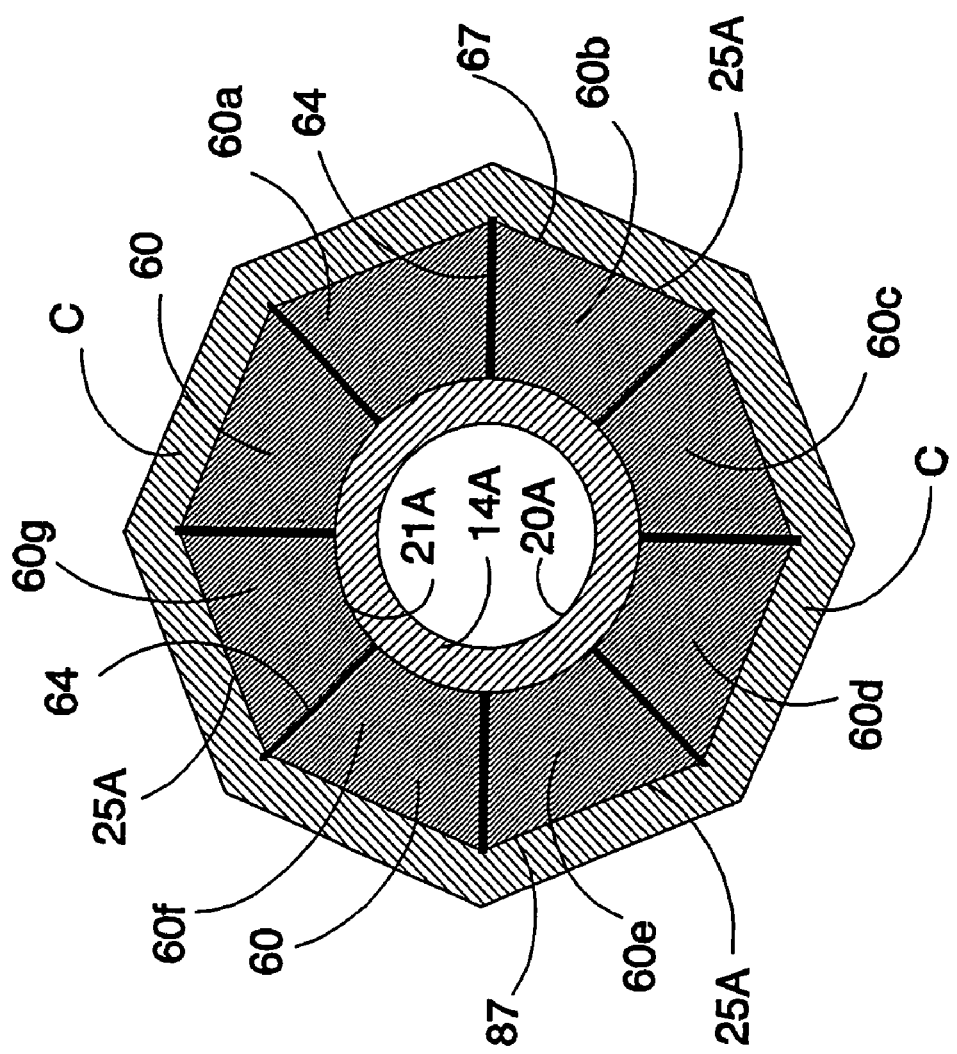
Figure 13:
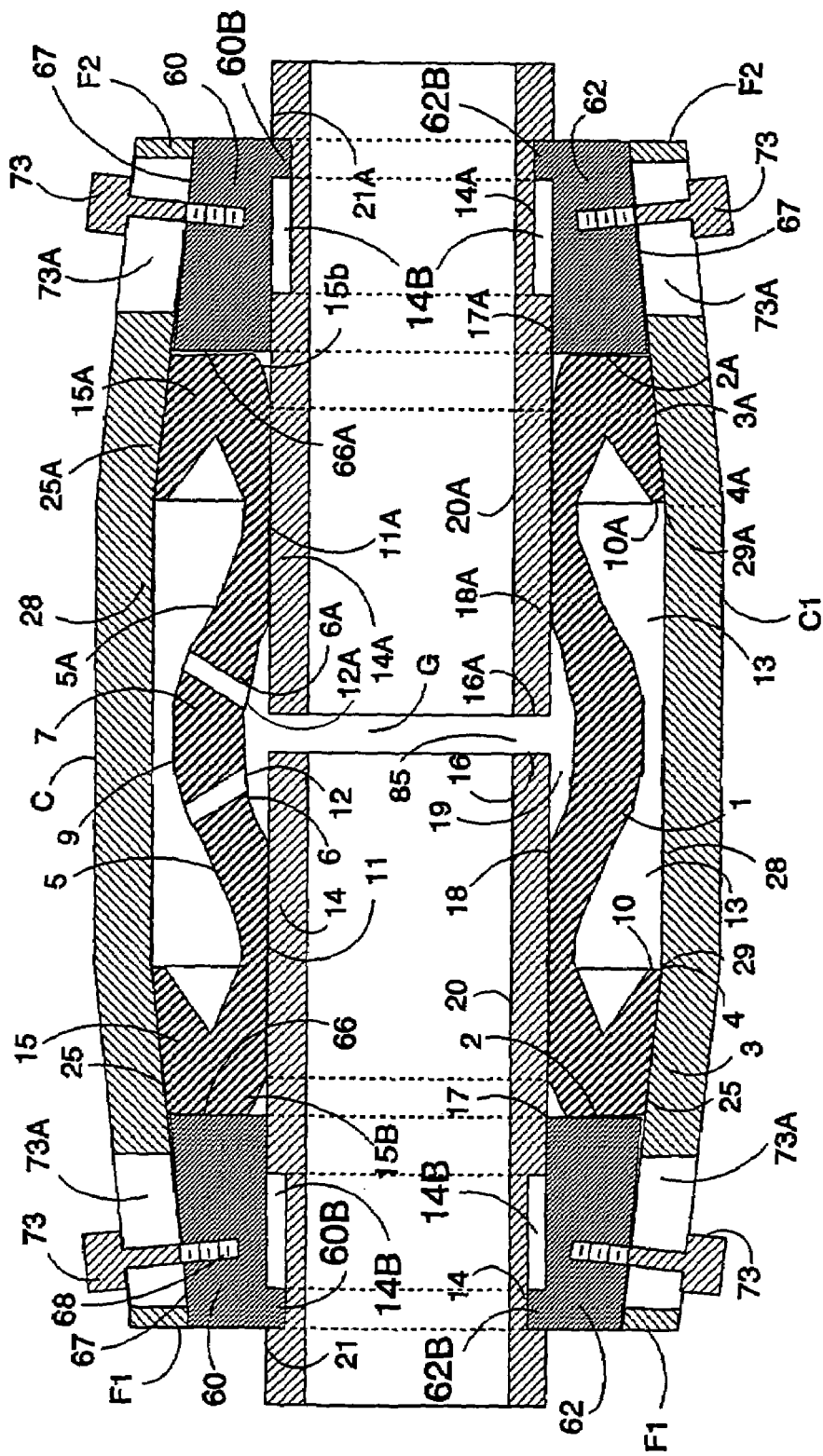
Figure 14:
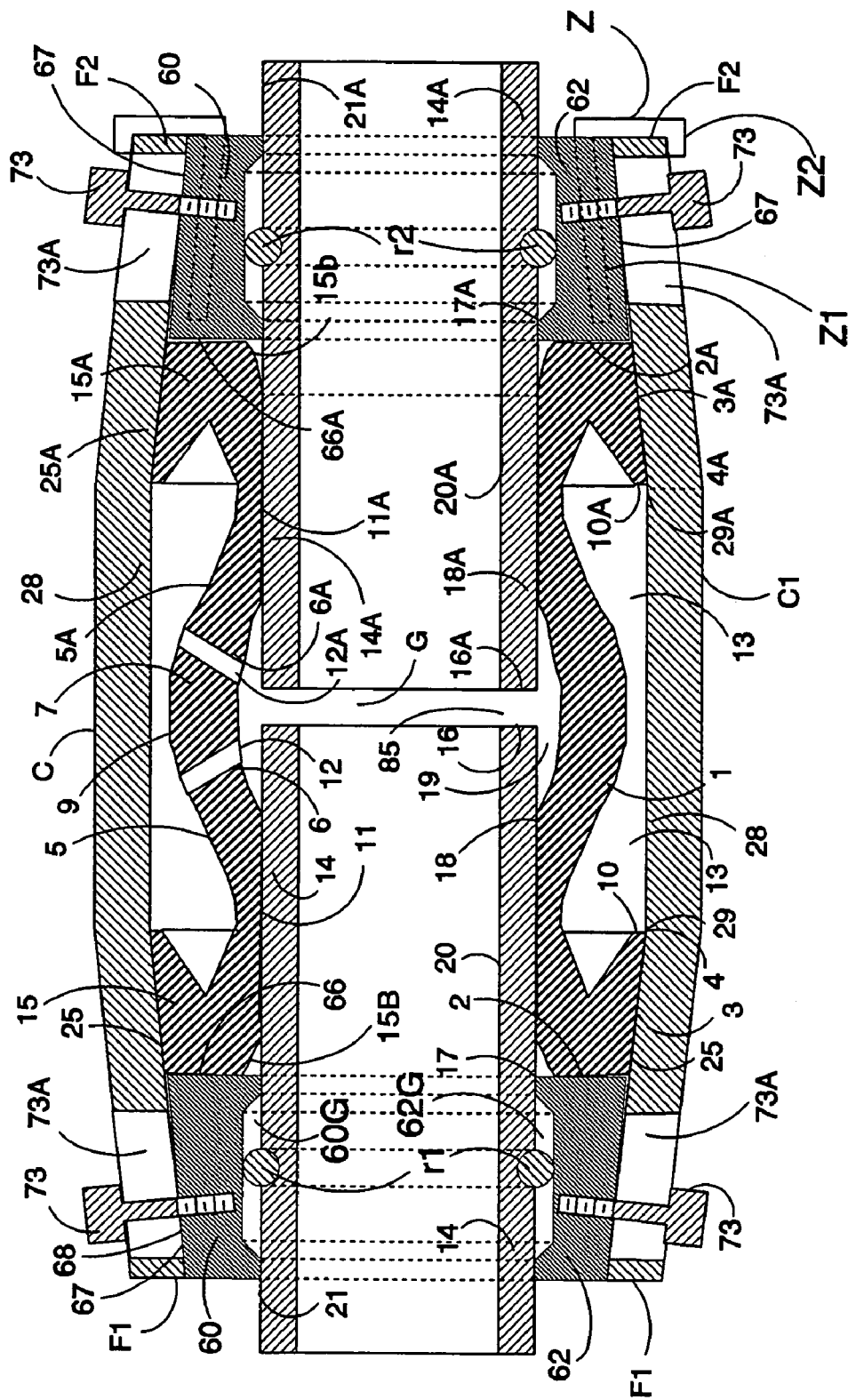

FIG. 9, a longitudinal vertical section exactly as in FIG. 8, but an axially stretchable crib ring inside the coupling body is a split ring, which ring can be contracted to dig into the plastic materials, such as polyethylene pipe installed underwater environment having more or less constant temperature, like the sea, rivers or lakes, where thermal change of the pipe is not expected;

FIG. 10, a FIG. similar to that of FIG. 4, but with the gasket modified to accommodate the high thermal expansion of pipe in environment where temperature change can be extreme, such as, polyethylene pipe above ground in desert;

FIG. 11, a FIG. similar to FIGS. 6 and 7 showing a crib ring in cooperable with the gasket;

FIG. 12, a transverse vertical section similar to that of FIG. 2, showing a pipe of circular cross section and a coupling body of polygonal cross section; and FIG. 13, a FIG. similar to FIG. 5, but with a grooved pipe and jaw extension or tab extending into the groove; and FIG. 14, a FIG. similar to FIG. 5, but with a groove in the jaws and a flange extending from the pipes into the grooves.

DETAILED DESCRIPTION OF THE ILLUSTRATED EMBODIMENT

All the drawings can be studied together. It is pointed out that the drawings are not to any particular scale. It is further pointed out that because of the simplicity of the drawings, if any element (such as a slidable jaw or the bolt to hold the jaw or bolt used as a puller of a jaw) is used more than once in the FIG., that element will be depicted by the same numbers and alphabets on both side of the FIG. unless otherwise depicted differently.

The coupling C in FIG. 1 is provided with a coupling body C1 having opposite inner tapers shown by 25 and 25A. A set of four jaws (where two jaws of the set are indicated by 60 and 62) are held slidably inside the opposite end portions of the coupling body C1 by means of slants depicted by 60A and 62A of jaws 60 and 62. The slants 60A and 62A slide along and against inner tapers 25 and 25A. Thus, as the jaws slide along the taper toward the ends of coupling body C1, the jaws move radially inwardly to tighten around and engage pipes 14 and 14A received within the coupling body. Conversely, as the jaws slide along the taper away from the ends of the coupling body and toward the center of the coupling body, the jaws can move radially outward away from the pipes 14 and 14A to release such pipes. The inner diameters of the pipes are indicated by 20 and 20A, and outer diameters are indicated by 21 and 21A respectively. The length of each coupling between its outer opposite ends, is indicated by F1 and F2. The inner diameter of the central cylindrical portion of the coupling body is shown by 28. There are preferably four slidable jaws in each set with a set of jaws at either side of the coupling, but in larger size couplings, each set may be provided with more than four jaws.

Opposite at the center of each of the jaws depicted by 60 and 62, a linear radial opening or slot 73A for the travel of bolts 73 is provided. Each jaw is provided an extension depicted by 69 and 69A fitted under gasket end portions 15 and 15A. The expanding push of the jaws shown by 60 and 62 enlarge the diameter of 15, and by tightening the bolts 73, the jaws are locked in place with the expanded diameter of said jaws, which further eases the mounting of the pipes 14 and 14A. In small size pipes where the diametrical tolerances are tight the mounting of the pipes in the coupling is not much of a problem, but in large size pipes where the range of tolerances are wider, it does create a problem in mounting of the pipe in a cylindrical coupling. Therefore, to over come this difficulty, the embodiment of FIG. 1 provides a coupling where slidable jaws of type 60 and 62 are provided on both ends of the coupling body. The coupling C provides a cavity 19 in conjunction with pipes 14 and 14A for diaphragm gasket seal 1. The cavity 19 is delineated by inner surfaces 28, 25, 66, 66A and 25A in the coupling body, and end portions of pipes 14 and 14A, and opposite faces 66 and 66A of the slidable jaws 60 and 62. Except for the pipes 14 and 14A, gasket 1 is delineated by numbers from 1 to 15. The two ends 2 and 2A of gasket 1 are abutted against two said faces 66 and 66A of jaws 60 and 62. The end portions of the gasket with the inclines 3 and 3A are depicted by 15 and 15A. The incline 3 and 3A of the gasket are extended clearly to the face 66 and 66A of said jaws 60 and 62. Fluid enters the diaphragm gasket seal through the gap G, between the ends 16 and 16A of pipes 14 and 14A, and then reaches inner cavity 13 through openings 12 and 12A. The fluid simultaneously pressurizes the entire diaphragm seal, including portions 11 between 17 and 18, and portion 11A between 17A and 18A, with 11 and 11A being positioned around 14 and 14A respectively. Thus the exit of the fluid, between pipe 14 and gasket portion 11, and pipe 14A and gasket portion 11A, is blocked. Openings 12 and 12A are located in the section between 6 and 6A, away from the ends 16 and 16A of pipes 14 and 14A. Under fluid pressure, the gasket ends 15 and 15A are squeezed by the components of pressure force, and create hydraulic grips, which become complementary force to help said sets of jaws 60 and 62 to hold the pipes in place. Thus, plain ended pipe can be connected by the coupling of this invention. The interior section between faces 10 and 10A of gasket 1 makes a bell type curve indicated by curves 5, 7 and 5A, where the bell accommodates the designed deflection of the pipe. The length of each of the sections 11 and 11A of the diaphragm shown in coupling of FIG. 1, in contact with the pipes, is preferably kept equal to half of the outside radius of the pipe, which is equated against the pressure acting against the shut off valve, but is not necessary and is not used in all embodiments. At the time of mounting of diaphragm gasket seal 1 around the pipe, the angular section of gasket shown rising from the pipe's surface is stretched in its diameter and also the rest portion of the diaphragm is stretched. Till the diaphragm is pressurized by the fluid, opposite angular portions of the bell section of the gasket nearest to the pipes and ends 15 and 15A of diaphragm 1 block the exit of the fluid from the pipe line.

The said slidable jaws 60 and 62 are preferably provided with gripping surfaces on the arcuate portions which contact the surface of the pipe end portion to be coupled. Such gripping surfaces may be provided by rubber material or by plastic or abrasive material or teeth to provide frictional contact with the pipe. Stem 85 of optional bolt 24 extends through hole 86 in coupling body C and keeps the coupling fixed with respect to two ends 16 and 16A of pipes 14 and 14A. Said Jaws 60 and 62 may be provided with teeth J12 to provide the gripping surface to grip the pipe or they may be provided with any type of rough surface. The teeth may be parallel to the axis of the pipe or concentric with pipe.

The movable jaws are held inside the coupling body by means of bolts 73. Preferably jaws are four or more in a set which provide the two outer walls of the coupling to create a cavity for the seal 1. Each jaw is provided with a bolt which moves along with the jaw in the linear radial cut 73A. Each jaw is provided an incline depicted by 67, which match the corresponding inner taper provided at the end portions of the coupling body. The squeezed seal 1 has a memory and acts as a spring to bias the jaws outwardly from the coupling body. Before the coupling is mounted over the pipe, the jaws on both sides are pushed into the coupling body to allow them to move radially outwardly to provide an opening for insertion of the pipes and to squeeze seal 1 between the jaws and the jaws are locked in place by tightening bolt 73. The bolts 73 pull the jaws radially outward and expand the diameter of the ends 15 and 15A of seal 1. The expanded diameter of the seal can accommodate the wider tolerances of the pipe. Once the coupling is mounted over the plain ends of pipes, the bolts are slackened, and they are hammered outward parallel to the axis of the pipe, thus moving the jaws inward toward the pipe. When the seal is charged with the fluid, the end portions of the seal 15 and 15A are pushed still further outward against the jaws under the outward pressure of the fluid exerting against the seal ends 15 and 15A, thus creating a hydraulic grip around the pipe and keeping the pipe from slipping away out of the coupling body.

FIG. 2 shows how the jaws 60, 61, 62 and 63 come together in a closed position around the pipe 14A secured in the coupling. The jaws and coupling body are preferably configured so that the sides of the jaws come together as at 64 when in closed position. FIG. 2 also shows the slidable bolts 73 in linear radial cuts 73A holding slidable jaws by means of their stems 68. However, when the jaws are moved outwardly toward the ends of the coupling so abut one another as shown in FIG. 2, they will stay together without bolts 73.

If the pipes are heavy or if the pipes are installed on a steep slope or have steep slopes, then the coupling shown in FIG. 3 may be provided with mechanical pulling means as described below.

FIG. 3 depicts two different types of mechanical pulling means to pull or move the movable jaws shown as 60 and 62 linearly outward toward the respective ends of the coupling, which means also can be applied to the couplings described in FIG. 1. The first type of mechanical pulling means is depicted on the left side of FIG. 3, by bolt J32 and flange J30 constructed with the movable jaw 60. The flange J30 has a threaded opening J31, preferably at its center, and threaded bolt J32 is mounted through opening J31. The mechanical pulling means as described by J30, J31 and J32 can be provided to all the movable jaws on both sides of the coupling or only to all the movable jaws on one side of the coupling, or to at least one movable jaw on both sides of the coupling or to at least one movable jaw only on one side of the coupling. The bolt J32 is screwed forward through opening J31 until its forward end meets face F1 and starts to exert pull against movable jaw 60 to secure a tight wedge between the pipe and the inner surface of the coupling body. The base J29 of flange J30 may be ridged or it may be designed to act like a spring. The flange J30 may be constructed as an integral piece as shown with the movable jaw 60, or it may be as an attached piece as depicted by J23 on the opposite side of the coupling in FIG. 3. In any event, in this embodiment, the bolt is considered as threaded into the jaw member and is considered as acting against the coupling body. The jaws can still be forced further out by fluid pressure against seal ends 15 and 15A. When only a single jaw is pulled out mechanically, the pipe is still held in position in the coupling and all jaws will tighten under fluid pressure. If the thickness of the circular wall of the body of coupling C is thin, and the portions next to the end faces F1 and F2 of the coupling are also thin; then to provide proper contact for the forwarding ends of stems of bolts J32 and J22 against said face F1 and F2, the thickness of faces F1 and F2 will be radially increased by constructing a flange of proper radial depth.

The second type of mechanical pulling or moving means is shown on right side of the coupling body in FIG. 3, which means also can be applied to the couplings described in FIGS. 1. The second type of mechanical pulling means is depicted on the right side of FIG. 3, by bolt J22 and flange J23 and base leg J26. The base leg J26 can be a threaded stem or it can be without threads. The stem J26 is mounted into opening J25. The flange J23 has a threaded opening J24. Threaded bolt J22 is mounted through opening J24. The mechanical pulling means as described by J22, J23, J24, J25, and J26 can be provided to all the movable jaws on both sides of the coupling body or only to all the movable jaws on one side of the coupling body, or to at least one movable jaw on both sides of the coupling or to at least one movable jaw only on one side of the coupling. The bolt J22 is screwed forward through opening J24 till its forwarding end meets face F2 and starts to exert pull against movable jaw 62, and secures a tight wedge between the pipe and the inner surface of the coupling body. The flange J23 and base stem J26 may be ridged or the flange J23 may be designed to act like a spring while J26 is kept ridged.

FIG. 4 is the same as FIG. 3, but with the following modifications: The coupling body C1 of coupling C is extended over the entire lengths of the set of jaws 60 and 62. Linear radial cuts 73 are extended clear to the new faces F1 and F2. For large pipe sizes where ends 15 and 15A of diaphragm gasket 1 will be thicker than the small size pipes, the ninety degree toe extensions depicted by 69 and 69B are provided for jaws 60 and 62 to expand said gasket ends 15 and 15A. The end 15 and 15A of diaphragm gasket 1 are expanded by means of the puller assembly depicted by bolt 92 with stem 97 passing through opening 93 provided in the head of bolt 91A of bolt 91, where stem 90 of each bolt 91 is threaded to jaws 60 and 62. The end 95 of threaded stem 97 of bolt 92 is mounted through threaded opening 96A of flange or tab 96. The head 91A of bolt 91 is provided unthreaded cross opening 93 and hole 94 (blind ended opening). Before the coupling is mounted over the pipe ends, the end 15 and 15A of the diaphragm gasket are expanded by means of said bolt assembly by rotating head 92 clockwise. The clockwise rotation of 92 moves the jaw 60 toward the center of the coupling body and simultaneously lifts up the jaw 60 and gasket end 15 from the surface 21 of pipe 14. Thus all the jaws inside both ends of the coupling are moved and lifted up, and the diaphragm is squeezed. First, jaws of one end of the coupling are mounted over the pipe by pushing the coupling over the pipe end and then by further pushing the curved section of the diaphragm is expanded and the pipe is properly positioned inside the coupling body. The bolts 92 are released and are mounted in the reverse order through threaded openings 96A of flange (or intermittent flange forming a tab) 96 into the blind end hole 94, and jaws 60 and 62 are moved outward to grip the pipe securely. After securing the first pipe, then the second pipe is pushed into the second end of the coupling and it is secured as the first pipe was secured on the other end of the coupling. The bolts 92 mounted in the reverse order are shown on the right end of the coupling body.

FIG. 5 is the same as FIG. 1 except that toes 69 and 69A for the jaws are not provided, and gasket 1 is provided rounded ends depicted by 15B. The rest of the coupling was explained under FIG. 1.

FIG. 6 is a longitudinal vertical section of a miniature version of the coupling of the invention used to attach two pipes or two hose shanks depicted by 14 and 14A. From here on the word pipe and the hose shank will be considered as synonyms. The end portion of each pipe is provided with a groove depicted by 14B. Each jaw in a set depicted by 60 and 62 are provided with radial flange keys 60B and 62B projecting radially toward the axis of the pipes. The keys 60B and 62B are constructed to equal depth of the circumferential groove 14B. By moving the jaws inward toward the center of the coupling the coupling, keys depicted by 60B and 62B of set of jaws depicted by 60 and 62 can be radially raised along with the jaws as the raising of the jaws explained earlier, and thus are set free from the grooves they were keyed in. Similarly, keys 60B and 62B can be lowered into the grooves 14B to be slidably locked with the grooves 14B. Linearly slidable bolts 73 in linear cuts 73A keeps the jaws connected to the coupling body C1. The upper end of the cut 73A is depicted by 73C and the lower end is depicted by 73D. The miniature version of the gasket 1 in FIGS. 6 and 7 is provide with a plurality of openings 12 at the center of the gasket for the fluid to reach cavity 13 from cavity 19 to charge and pressurize the gasket 1. The function of the miniature gasket 1 is the same as explained for the function of the large gasket 1 in other FIGS. The pressurized miniature gasket 1 pushes the jaws outward and keeps the keys 60B and 62B locked in grooves 14B. First, the first receiving end of the miniature coupling is pushed around the end portion of the first pipe, and jaws of the first set of the coupling are expanded, and keys 60B of the jaws are lowered into the groove 14B to be locked inside groove 14B. Then the end portion of the second pipe is pushed into the second receiving opening of the coupling, and by pushing against the interference of key 60B the jaws of the second set of the coupling are raised till keys 60B are lowered into the groove 14B to be locked inside the groove 14B. The length of grooves 14B is predetermined so that by sliding the coupling to an extreme distance, distance equal to 14C or 14D, one of the jaw is raised out of the groove 14B or it is lowered to lock in with the groove, whatever the case may be. Once the coupling is connected with the pipes then the bolts 73 are screwed into the coupling body C to a depth as shown on right side of the coupling by 73D. The jaws on the left side of the coupling equally can be locked in place by providing locking washer under the heads of bolts. The length of the groove section 14C is kept greater than the expected thermal expansion equal to gap G provided between pipes 14 and 14A. Thus, under thermal expansion of the pipes, keys 60B and 62B remain free from any stress. The miniature coupling also can accommodated predetermined thermal expansion of the pipe, and thus can function as an expansion joint. The rest of the coupling was explained under FIG. 1 and other FIGS. FIG. 11 shows a similar arrangement with spring crib rings R1 with ends R4 and R5 to hold the gasket 5A against the pipes and keep the jaws pushed outwardly.

FIG. 7 is the same miniature version of the invented coupling as shown in FIG. 6, but the jaws are modified to attach two pipes, each pipe having a circumferential shoulder ring r1 around its end portion. Outer faces of jaws 60 and 62 are shown by 60H and 62H. The grooves in the inner body of jaws 60 and 62 are depicted by 60G and 62G. First, the first receiving end of the miniature coupling is pushed around the end portion of the first pipe, and jaws of the first set of jaws of the coupling are expanded by the interference of the welded ring r1 and outer inclined faces 60H and 62H of the slidable jaws depicted by 60 and 62. Once the jaws are crossed over ring r1, then grooves 60G and 62G of the jaws of the first set are lowered to envelop the ring r1 to lock the jaws against ring r1 around the end portion of the first pipe. Then the end portion of the second pipe is pushed into the second receiving opening of the coupling, and by pushing against the interfering outer faces 60H and 62H of the jaws, the jaws of the second set of jaws of the coupling are raised till the jaws cross over welded ring r1 around the end portion of the second pipe. Once the jaws are crossed over ring r1, then grooves 60G and 62G of the jaws of the second set of the coupling are lowered to envelop ring r1 to lock the jaws against ring r1 around the end portion of the second pipe.

As discussed under FIG. 6, the length of grooves 60G and 62G is predetermined to accommodate thermal change in the length of pipe. The pipe in FIG. 7 is installed in a mode to accommodate expected thermal expansion equal to the length of gap G. The rest of the coupling was explained under FIG. 6 and other FIGS.

FIG. 8 is the same coupling as shown in FIG. 1, but an axially stretchable crib ring R is positioned inside the coupling body for plastic or polyethylene pipe which have high thermal coefficients of expansion. For instance, polyethylene pipe can gain increment in its forty foot length of four inches for a 100 degrees Fahrenheit change in temperature. In such variation of temperature where the jaws of FIG. 4 are not used and jaw pullers are also not used, the crib ring is positioned inside of the coupling body C1 to restrict the movement of the gasket with movement of the pipe. The crib ring is made of a springy ridged material chemically compatible with the fluid in the pipe line. The crib ring is constructed by setting two toe rings R4 and R5 apart by the intermediate frame work, which is made of inclined ribs R2 and R3 and central ring R1 (of predetermined width and thickness) connected to R4 and R5 through the intermediate ribs R2 and R3. The crib ring is kept in place by the coupling body as well as by the gasket itself. The rest of the coupling was discussed before in other FIGS.

FIG. 9 is the same as FIG. 8, and crib ring R is of the same design, except that ring toes R4 and R5, and ring R are broken in a common plane. Split in the ring R is depicted by S1. This type of ring can be used (for polyethylene pipe) in the water environment, such as, under sea, under river and on lake beds where temperature more or less remains constant or changes little, by only a few degrees Farenheit. Such a pipe is stung at the surface of the water and then are pulled in a train fashion to be lowered and sunk in the water by exhausting air in the pipe. The toes R11 and R12 are pressed into the wall of the pipe to bite the pipe wall. The means made of a plurality of bolts R6 are used to compress toes R11 and R12 of the crib ring R. By screwing and advancing end R8 of stem R7 of bolt R6, ring R decreases in diameter and is moved inward toward the center of the pipe and the coupling body. Bolt head R6 is compressed against gasket seal R9 to make a water tight seal. Spring loaded expandable seals can be installed between C1 and R1 around bolt stem R7. The toes R11 and R12 compress against the V gaskets 15 and 15A and keep them in place or can be made to push the gasket apart. If the pipe line is very long and turbulent water is expected, then grooves g1 and g2 are provide and toes R11 and R12 are mounted into these groove to lock them in place in the grooves. By relaxing the bolt toes R11 and R12 are receded out of the grooves g1 and g2, and the pipe is freed. The rest of the coupling was discussed previously with other FIGS. This type of arrangement can also be used with the embodiment shown in FIG. 11. It is also pointed out here that bolts like R6 can also be used with a crib ring in FIG. 8 to retain 15 and 15A in place or to push them apart to push outward jaws 60 and 62. It is also pointed out here that if the crib ring of FIG. 9 without slit (shown in FIG. 8) is used with the coupling C in FIGS. 10 and 4, then blind hole 94 with blind end 98, shown in FIG. 4, can be eliminated.

FIG. 10 is similar to FIG. 4, but gasket seal 1 is modified. This addresses the same problem as the coupling in FIG. 8 is designed to address, that is, the excessive linear expansion of the pipe with temperature changes. The coupling in FIG. 8 might be alright in the case of gravity flow where loss of energy might not be of any economic consideration; but where pumps are being used to push the water through a pipe line in a desert, the economic cost to run the pump cannot be ignored. Thus, an energy efficient seal is provided in the embodiment of FIG. 10. Between the pipe ends 16 and 16A of pipes 14 and 14A is fitted an ovaloid section of gasket 1. The interior wall 9A of the ovaloid section can be thinner than the opposite wall 9. The wall 9A is provided with a plurality of linear incision like cuts S running parallel to the axis of the pipe line. Under thermal expansion when the ends 16 and 16A of pipes 14 and 14A advance toward each other, the strips between the cuts S are deflected outward, but deflection creates only minuscule gaps between the cuts. The incision cuts S are parallel to the stream lines of the water, thus, generation of eddy currents and resulting energy loss is minimized. It is understood that the ovaloid seal of FIG. 10 can be used with embodiments of other FIGS. too. The rest of the coupling was discussed previously with other FIGS.

In the coupling of FIG. 12, instead of a cylindrical coupling body, the coupling is shown as octagonal in its vertical transverse section. Eight jaws are shown by 60, 60a, 60b, 60c, 60d, 60e, 60f and 60g in engaged locking position against the outer surface 21A of pipe 14A. The outer and inner diameters of the pipe are depicted by 21A and 20A. The lines 64 depicts the common plane between any two jaws. The coupling can be constructed to any polygonic cross section. The rest of the coupling was discussed under FIG. 4.

The coupling shown in FIG. 13 is similar to the coupling of FIG. 1, but shows the end portion of each pipe provided with a groove depicted by 14B, as shown in FIG. 6. Also as shown in FIG. 6, each jaw in a set depicted by 60 and 62 are provided with radial flange keys 60B and 62B projecting radially toward the axis of the pipes. The keys 60B and 62B are constructed to equal depth of the circumferential groove 14B. By moving the jaws inward toward the center of the coupling, the keys depicted by 60B and 62B of the set of jaws depicted by 60 and 62 can be radially raised along with the jaws as the raising of the jaws explained earlier, and thus are set free from the grooves they were keyed in. Similarly, keys 60B and 62B can be lowered into the grooves 14B to be slidably locked with the grooves 14B. Linearly slidable bolts 73 in linear cuts 73A keeps the jaws connected to the coupling body C1. The upper end of the cut 73A is depicted by 73C and the lower end is depicted by 73D.

The coupling shown in FIG. 14 is similar to the coupling of FIG. 1, but shows each pipe having a circumferential shoulder ring r1 around its end portion. With a plastic pipe, the ring r1 can be a split ring placed around the pipe end portion and heated to allow the ring r1 to melt a groove into the plastic to position the ring. The grooves in the inner body of jaws 60 and 62 are depicted by 60G and 62G. First, the first receiving end of the coupling is pushed around the end portion of the first pipe, and jaws of the first set of jaws of the coupling are expanded by the interference of the shoulder ring r1 and outer faces of the slidable jaws depicted by 60 and 62. Once the jaws are crossed over ring r1, then grooves 60G and 62G of the jaws of the first set are lowered to envelop the ring r1 to lock the jaws against ring r1 around the end portion of the first pipe. Then the end portion of the second pipe is pushed into the second receiving opening of the coupling, and by pushing against the interfering outer faces of the jaws, the jaws of the second set of jaws of the coupling are raised till those jaws cross over ring r1 around the end portion of the second pipe. Once the jaws are crossed over ring r1, then grooves 60G and 62G of the jaws of the second set of jaws are lowered to envelop ring r1 to lock the jaws against ring r1 around the end portion of the second pipe.

As discussed for the embodiments of FIGS. 6 and 7, the length of the grooves 14B in the pipes of FIG. 13 and the grooves 60G and 62G in the jaws of FIG. 14, are predetermined to accommodate thermal change in the length of the pipes. The pipes are installed in a mode to accommodate expected thermal expansion equal to the length of gap G. Thus, the pipe ends are free to slide in the coupling as the pipes expand and contract, but are held in the coupling by the interaction of the flange keys with the pipe grooves or the interaction of the pipe ring and the grooves in the jaws.

While bolts have been shown to hold the jaw members to the coupling body, other connections can be used. For example, rather than the bolts 73 in FIG. 14, rods or brackets shown by Z, Z1 and Z2 can be secured to the end or end portion of coupling body C1, such as by welding Z2 to coupling body C1, by bolting Z or Z2 to coupling body C1, or by other attachment means, with the portion Z1 thereof extending into a receiving hole in the jaw members 60 and 62 so the jaw members are held by Z1 and can slide along Z1. It is pointed out that, alternately, portions Z and Z2 can be installed through a radial opening provided in coupling body C1 rather than on the end of body C1, and Z and Z2 need not be outside the coupling body against face F2, as shown in FIG. 14. Such attachment can be used in any of the embodiments and on one or both ends of the coupling. The attachment of the jaw members to the coupling body insure that the jaw members will remain in their relative positions when moved inwardly into the coupling body to allow insertion of the pipe, or to free the pipe from the coupling. Further, while various means of securements and adjustments have been shown with various embodiments, these can be used with other embodiments or may or may not be used or may be changed in various ways to accommodate various embodiments.

It is understood that one end of the invented coupling may have a different type of connection, such as a flange connection, a threaded connection, a ring connection, or any other type of jaw connection, to meet different requirements and conditions in making connections with pipes, hoses, pipe and hose fittings, and valves. It is also understood that the body of the coupling can be polygonic in geometry, and jaws can be polygonic in their periphery and cylindrical in their inner surface. It is also understood that whereever necessary, any corners of the coupling, including the gasket can be rounded off. It is further understood that various changes may be made in adapting the invention to different embodiments without departing from the broader inventive concepts disclosed herein and comprehended by the claims that follow.

I claim:

1. A coupling for attachment to an end portion of a pipe, comprising:

a coupling body to closely receive an end portion of a pipe to be coupled therewith, said coupling body including an inner end taper and an outer end taper corresponding to the inner end taper;

a set of jaw members slidably positioned in the inner end taper of the coupling body so that linear movement of the jaw members toward the end of the inner end taper adjacent an end of the coupling body causes movement of the jaw members radially inwardly of the coupling body against the end portion of the pipe when received in the coupling body; and means for securing the jaw members to the coupling body, said means cooperable with the outer end taper so that linear movement of the jaw members away from the end of the inner end taper adjacent the end of the coupling body causes movement of the jaw members radially outwardly of the coupling body away from the end portion of the pipe when received in the coupling body.

2. A coupling for attachment to an end portion of a pipe according to claim 1, wherein the means for securing the jaw members to the coupling body includes linear slots through the coupling body, and bolts extending from the jaw members slidably through the slots.

3. A coupling for attachment to an end portion of a pipe according to claim 2, wherein the bolts have heads at one end, and wherein at least one of the linear slots has an end portion toward the end of the inner end taper adjacent an end of the coupling body and a bolt head receiving recess in that end portion which receives the bolt head of the bolt extending through that slot to lock the bolt and jaw member from which it extends in position toward the end of the inner end taper adjacent an end of the coupling body.

4. A coupling for attachment to an end portion of a pipe according to claim 1, wherein the coupling joins two pipes in end to end relationship, each pipe having an end portion, wherein the coupling body is adapted to closely receive the end portion of each of the two pipes to be joined in end to end relationship, the set of jaw members being located toward one end of the coupling body to engage the end portion of one of the two pipes to be joined, the coupling further including a second coupling body inner end taper and outer end taper corresponding to the inner end taper adjacent the other end of the coupling body;

a second set of jaw members slidably positioned in the second inner end taper of the coupling body so that linear movement of the jaw members of the second set of jaw members toward an end of the second inner end taper causes movement of the jaw members of the second set of jaw members radially inwardly of the coupling body against the end portion of the other of the two pipes to be joined when the other pipe is received in the coupling body; and second means for securing the jaw members of the second set of jaw members to the coupling body, said second means cooperable with the second coupling body outer end taper so that linear movement of the jaw members of the second set of jaw members away from the end of the second coupling body inner end taper causes movement of the jaw members of the second set of jaw members radially outwardly of the coupling body away from the end portion of the other of the two pipes to be joined when the other pipe is received in the coupling body.

5. A coupling for attachment to an end portion of a pipe according to claim 4, wherein the means and the second means for securing the jaw members to the coupling body includes linear slots through the coupling body, and bolts extending from the jaw members slidably through the slots, wherein the bolts have heads at one end, and wherein at least one of the linear slots at each of the inner end taper and second inner end taper has an end portion toward the end of the inner end taper or second inner end taper adjacent an end of the coupling body and a bolt head receiving recess in that end portion which receives the bolt head of the bolt extending through that slot to lock the bolt and jaw member from which it extends in position toward the end of the inner end taper or second inner end taper adjacent an end of the coupling body.

6. A coupling for attachment to an end portion of a pipe according to claim 4, wherein at least one jaw member of at least one of the set of jaw members and the second set of jaw members includes means for mechanically moving the at least one jaw member linearly outwardly toward the end of the inner end taper and second inner end taper to tighten the jaw members about a pipe received in the coupling.

7. A coupling for attachment to an end portion of a pipe according to claim 6, wherein the means for mechanically moving the at least one jaw member outwardly includes a tightening bolt.

8. A coupling for attachment to an end portion of a pipe according to claim 7, wherein at least one jaw member of at least one of the set of jaw members and the second set of jaw members includes means for mechanically moving the at least one jaw member linearly inwardly away from the end of the inner end taper and second inner end taper to loosen the jaw members about a pipe received in the coupling.

9. A coupling for attachment to an end portion of a pipe according to claim 8, wherein the means for mechanically moving the at least one jaw member includes a loosening bolt.

10. A coupling for attachment to an end portion of a pipe according to claim 9, wherein the means for mechanically tightening and for mechanically loosening the at least one jaw member includes a tab extending from the connector body with threaded hole therethrough to selectively threadedly receive the tightening and loosening bolt, and wherein the bolt head of the bolt extending from the at least one jaw member through the slot includes both a hole through which the tightening bolt can extend when the hole is aligned with the hole through the tab and a dead end hole into which an end of the loosening bolt can extend when the dead end hole is aligned with the tab.

11. A coupling for attachment to an end portion of a pipe according to claim 10, wherein the same bolt can be selectively used as the tightening and loosening bolt depending upon the bolt orientation through the hole in the tab.

12. A coupling for attachment to an end portion of a pipe according to claim 1, wherein at least one jaw member of the set of jaw members includes means for mechanically moving the at least one jaw member linearly outwardly toward the end of the inner end taper to tighten the jaw members about a pipe received in the coupling.

13. A coupling for attachment to an end portion of a pipe according to claim 12, wherein the means for mechanically moving the at least one jaw member includes a tightening bolt.

14. A coupling for attachment to an end portion of a pipe according to claim 13, wherein the tightening bolt is threaded into the jaw member and rotation of the tightening bolt causes the tightening bolt to act against the coupling body to move the jaw member in relation to the coupling body.

15. A coupling for attachment to an end portion of a pipe according to claim 1, wherein at least one jaw member of the set of jaw members includes means for mechanically moving the at least one jaw member linearly inwardly away from the end of the inner end taper to loosen the jaw members about a pipe received in the coupling.

16. A coupling for attachment to an end portion of a pipe according to claim 15, wherein the means for mechanically moving the at least one jaw member includes a loosening bolt.

17. A coupling for attachment to an end portion of a pipe according to claim 1, wherein the means for securing the jaw members to the coupling body includes linear slots through the coupling body and bolts extending from the jaw members slidably through the slots, wherein at least one jaw member of the set of jaw members includes a tightening bolt for mechanically moving the at least one jaw member linearly outwardly toward the end of the inner end taper and a loosening bolt for mechanically moving the at least one jaw member linearly inwardly away from the end of the inner end taper, wherein the means for mechanically moving the at least one jaw member outwardly and for mechanically moving the at least one jaw member inwardly includes a tab extending from the connector body with threaded hole therethrough to selectively threadedly receive the tightening bolt and the loosening bolt, and wherein the bolt head of the bolt extending from the at least one jaw member through the slot includes both a hole through which the tightening bolt can extend when the hole is aligned with the hole through the tab and a dead end hole into which an end of the loosening bolt can extend when the dead end hole is aligned with the tab.

18. A coupling for attachment to an end portion of a pipe according to claim 1, wherein the pipe to be received in the coupling has an end groove therein, and the jaw members are adapted to engage the groove in the pipe end portion when the pipe is received in the coupling body.

19. A coupling for attachment to an end portion of a pipe according to claim 18, wherein the jaw members are adapted to loosely engage the groove to allow the pipe end portion to slide with respect to the jaw members upon expansion or contraction of the pipe.

20. A coupling for attachment to an end portion of a pipe according to claim 1, wherein the pipe to be received in the coupling has a shoulder ring extending therefrom, and the jaw members include a groove adapted to engage the shoulder ring in the pipe end portion when the pipe is received in the coupling body.

21. A coupling for attachment to an end portion of a pipe according to claim 20, wherein the jaw members are adapted to loosely engage the shoulder ring to allow the pipe end portion to slide with respect to the jaw members upon expansion or contraction of the pipe.

22. A coupling for attachment to an end portion of a pipe according to claim 1, wherein the coupling is adapted to join end portions of two pipes and wherein the coupling body includes at least one gasket for sealing around the end portions of the pipes to be joined to prevent leakage therefrom.

23. A coupling for attachment to an end portion of a pipe according to claim 22, wherein the at least one gasket is a bell type gasket.

24. A coupling for attachment to an end portion of a pipe according to claim 22, wherein the pipes to be joined form a gap in the coupling body between the pipe end portions and the at least one gasket bridges the gap and contacts and seals respective pipe end portions in the coupling body.

25. A coupling for attachment to an end portion of a pipe according to claim 24, additionally including a crib ring cooperative with the at least one gasket to spread the at least one gasket over the gap.

26. A coupling for attachment to an end portion of a pipe according to claim 25, wherein the crib ring has an outside perimeter, and additionally including means for pressing the outside perimeter against the pipe end portions received in the coupling.

27. A coupling for attachment to an end portion of a pipe according to claim 24, wherein the at least one gasket extends substantially smoothly over and between the gap to substantially prevent eddying of fluid flowing in the pipes, and includes strips between incisions therein to allow strips to deflect as the pipe end portions move in relation to one another during thermal expansion and contraction of the pipes.

* * * * *